(12) United States Patent
Takeuchi et al.

(10) Patent No.: US 9,977,616 B2
(45) Date of Patent: May 22, 2018

(54) STORAGE DEVICE AND STORAGE CONTROL METHOD

(71) Applicant: FUJITSU LIMITED, Kawasaki-shi, Kanagawa (JP)

(72) Inventors: Toshiaki Takeuchi, Nagano (JP); Fumio Matsuo, Nagano (JP); Katsuo Enohara, Kawaguchi (JP); Takaaki Yamato, Nagano (JP); Takashi Murayama, Nagano (JP); Takuya Kurihara, Nagano (JP); Akira Ban, Nagano (JP); Nobuyuki Hirashima, Nagano (JP); Ryota Tsukahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 14/833,451

(22) Filed: Aug. 24, 2015

(65) Prior Publication Data

US 2016/0085472 A1    Mar. 24, 2016

(30) Foreign Application Priority Data

Sep. 24, 2014   (JP) .................................. 2014-193321

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/0664* (2013.01); *G06F 3/0685* (2013.01)

(58) Field of Classification Search
None
See application file for complete search history.

(56) References Cited

U.S. PATENT DOCUMENTS

2006/0106970 A1* 5/2006 Matsuda ............... G06F 3/0605
                                                              711/4
2011/0225117 A1   9/2011 Nakanishi et al.

FOREIGN PATENT DOCUMENTS

JP         9-50351      2/1997
JP         2011-186794  9/2011

* cited by examiner

*Primary Examiner* — David Yi
*Assistant Examiner* — Craig S Goldschmidt
(74) *Attorney, Agent, or Firm* — Staas & Halsey LLP

(57) ABSTRACT

A storage device includes: a plurality of first storage devices; a second storage device; and a control device to use the plurality of first storage devices as a primary storage and the second storage device as a secondary storage, control access processing to a plurality of logical volumes each of which indicates a virtual recording medium, register a logical volume for which a mount request is made within a predetermined period of time among the plurality of logical volumes in an management information as the logical volume which belongs to the same group, and allocate a storage area of the primary storage corresponding to each of a plurality of registered logical volumes which belong to a group registered in the management information to any one of the plurality of first storage devices such that an allocation destination of the storage area is distributed among the plurality of first storage devices.

11 Claims, 14 Drawing Sheets

| GROUP MANAGEMENT TABLE |||||  |
|---|---|---|---|---|---|
| HOST NAME | GROUP NAME | GROUP FLAG | VOLUME NAME | VOLUME FLAG | MOUNT REQUEST TIME |
| H1 | G1 | true | X1 | true | T1 |
| | | | X2 | true | |
| | | | X3 | false | |
| | G2 | false | X11 | false | T2 |
| | | | X12 | false | |
| | | | X13 | false | |
| | ... | ... | ... | ... | ... |
| H2 | G11 | true | Y1 | true | T11 |
| | | | Y2 | true | |
| | | | Y3 | true | |
| | ... | ... | ... | ... | ... |
| H3 | G21 | true | Z1 | true | T21 |
| | | | Z2 | true | |
| | | | Z3 | true | |
| | ... | ... | ... | ... | ... |

FIG.8

| CACHE MANAGEMENT TABLE | | | 312 |
|---|---|---|---|
| DISK ARRAY NAME | VOLUME NAME | MOUNT STATUS FLAG | CACHE RETENTION FLAG |
| D1 | X1 | true | true |
| | X11 | false | true |
| | ... | ... | ... |
| | Y1 | true | true |
| | ... | ... | ... |
| | Z1 | true | true |
| | ... | ... | ... |
| D2 | X2 | true | true |
| | X12 | false | true |
| | ... | ... | ... |
| | Y2 | true | true |
| | ... | ... | ... |
| | Z2 | true | true |
| | ... | ... | ... |
| D3 | X3 | false | false |
| | X13 | false | true |
| | ... | ... | ... |
| | Y3 | true | true |
| | ... | ... | ... |
| | Z3 | true | true |
| | ... | ... | ... |

FIG.9

| VOLUME MANAGEMENT TABLE 313 ||
|---|---|
| VOLUME NAME | WRITE DESTINATION TAPE NAME |
| X1 | TP1 |
| X2 | TP1 |
| X3 | TP2 |
| ... | ... |

STORAGE DEVICE AND STORAGE CONTROL METHOD

CROSS-REFERENCE TO RELATED APPLICATION

This application is based upon and claims the benefit of priority from the prior Japanese Patent Application No. 2014-193321 filed on Sep. 24, 2014, the entire contents of which are incorporated herein by reference.

FIELD

The embodiments discussed herein are related to a storage device and a storage control method.

BACKGROUND

In recent years, a hierarchical virtual storage device has been known in which a library device provided with a low-cost recording medium having a large capacity such as a magnetic tape is used as a back end storage device (e.g., a secondary storage) and a storage device having a higher access speed such as a HDD (Hard Disk Drive) is used as a cache device (e.g., a primary storage). A virtual storage device is provided a control device which controls access to the cache device and the library device. The control device makes a host device to recognize that a logical volume stored in the cache device is a volume corresponding to a recording medium of the library device. Accordingly, the host device is able to use a large capacity storage area provided by the library device as if the storage area is connected to its own device.

Further, as an example of a technology regarding a storage device, a technology has been suggested in which a determination as to whether a virtual volume constituted by a plurality of virtual storage areas is regarded as a target to be a dynamical rearrangement is made depending on a condition based on an IOPS (Input Output Per Second). Further, a technology has also been known in which a storage area having a volume code is equally divided and a logical volume code is allowed to be associated with each of the divided sub-storage areas to retrieve the logical volume code associated with the volume code designated by a higher-level device.

Related technologies are disclosed in, for example, Japanese Laid-Open Patent Publication No. 2011-186794 and Japanese Laid-Open Patent Publication No. H09-50351.

SUMMARY

According to an aspect of the invention, a storage device includes: a plurality of first storage devices; a second storage device; and a control device configured to use the plurality of first storage devices as a primary storage and the second storage device as a secondary storage, control access processing to a plurality of logical volumes each of which indicates a virtual recording medium, register a logical volume for which a mount request is made within a predetermined period of time among the plurality of logical volumes in an management information as the logical volume which belongs to the same group, and allocate a storage area of the primary storage corresponding to each of a plurality of registered logical volumes which belong to a group registered in the management information to any one of the plurality of first storage devices such that an allocation destination of the storage area is distributed among the plurality of first storage devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a group management table;

FIG. 8 is a diagram illustrating an example of a cache management table;

FIG. 9 is a diagram illustrating an example of a volume management table;

DESCRIPTION OF EMBODIMENTS

In the hierarchical virtual storage device, a storage area functioning as a cache device may be implemented with a plurality of storage devices. In this case, data are distributively arranged in the plurality of storage devices for each logical volume such that access operations are performed in parallel in the plurality of storage devices and an access processing speed in the virtual storage device may be increased in its entirety.

However, when data of a plurality of logical volumes are simply distributively arranged, a period of time during which accesses are concentrated onto a specified storage device may occur. This is because a frequency or transition of access is different for each logical volume. As described above, when accesses are concentrated on the specified storage device, a degree of parallelism for access operations is decreased and thus, the access processing speed in the virtual storage device is decreased in its entirety.

In the following, an embodiment of a technology of increasing the possibility that the access processing is performed at high speed will be described with reference to accompanying drawings.

First Embodiment

Figure 1:
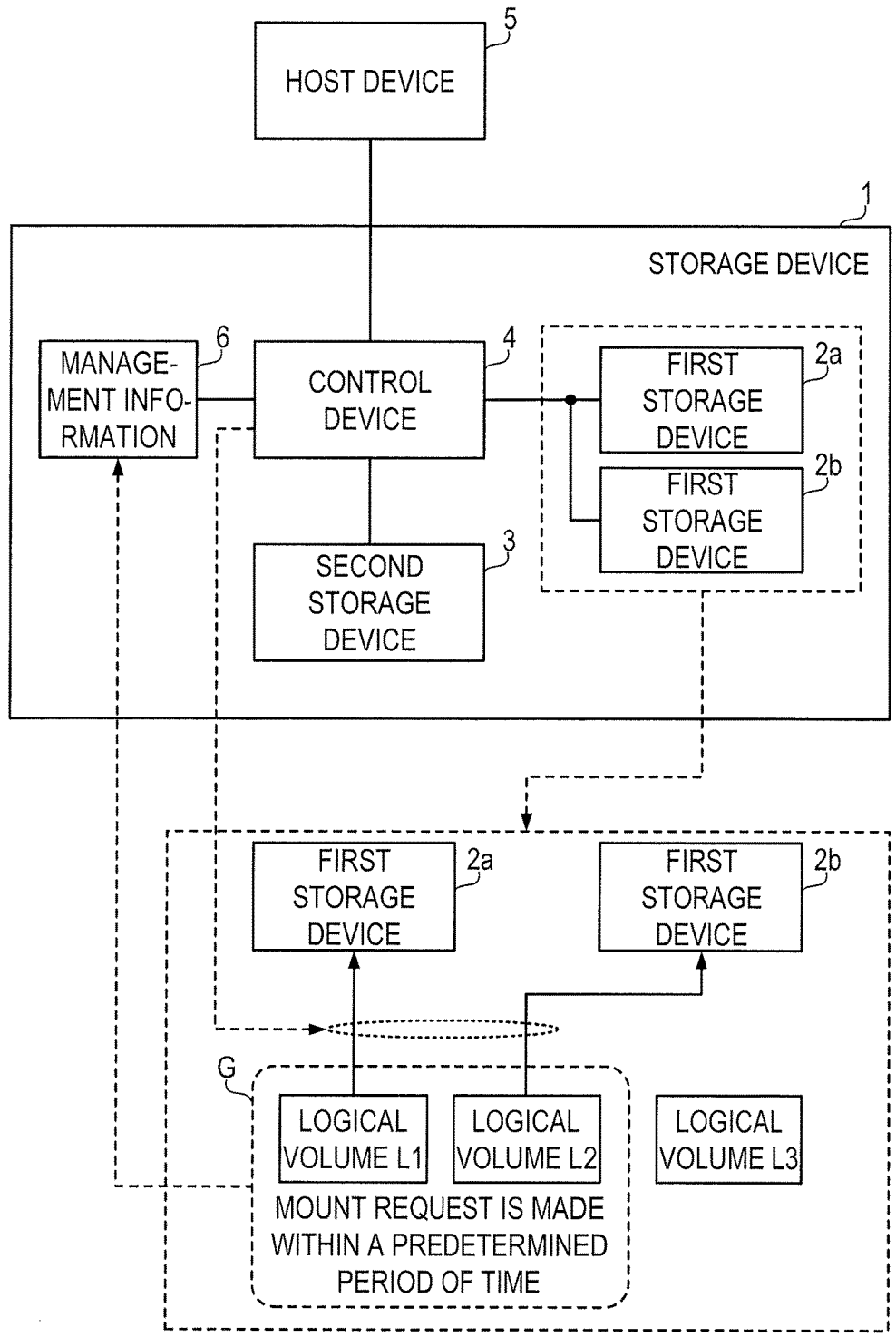
FIG. 1 is a diagram illustrating a storage system according to a first embodiment.

FIG. 1 is a diagram illustrating a storage system according to a first embodiment. The storage system includes a storage device 1 and a host device 5. The storage device 1 includes first storage devices 2a and 2b, a second storage device 3, and a control device 4. The host device 5 is connected to the control device 4. The control device 4 is also connected to the first storage devices 2a and 2b and the second storage device 3.

An access speed from the control device 4 to the first storage devices 2a and 2b is faster than an access speed from the control device 4 to the second storage device 3. For example, when the second storage device 3 is a storage device using a portable recording medium such as a magnetic tape or an optical disk as a recording medium, the storage devices 2a and 2b may be implemented by a device equipped with a fixed type non-volatile recording medium such as an HDD or SSD (Solid State Drive), or a volatile semiconductor such as a DRAM (Dynamic Random Access Memory) or SRAM (Static Random Access Memory).

The control device 4 uses the first storage devices 2a and 2b as a primary storage (cache device) and the second storage device 3 as a secondary storage so as to control the access processing to a plurality of logical volumes each of which indicates a virtual recording medium. That is, the control device 4 controls the operations of a hierarchical virtual storage device in which the first storage devices 2a and 2b are defined as the primary storage and the second storage device 3 is defined as the secondary storage. Further, the number of the first storage devices used as the primary storage may be three or more, rather than two as in the example of FIG. 1.

The host device 5 requests the storage device 1 to mount the logical volume such that an access to the logical volume becomes possible. The term of "mount" indicates that a logical volume is inserted into a virtual drive device of a virtual recording medium associated with the logical volume and access to the recording medium becomes possible. The data of the logical volume for which the mount request is made become in a state of being stored in any one of the first storage devices 2a and 2b by a control of the control device 4. For example, when the data of the logical volume for which a mount request is made are not stored in any of the first storage devices 2a and 2b, the data of the logical volume are read from the second storage device 3 and are stored in any one of the first storage devices 2a and 2b.

In the meantime, the data of the logical volume for which an unmount request is made are moved from the primary storage to the secondary storage, that is, stored in the second storage device 3, by the control of the control device 4. Further, the data of the logical volume stored in the primary storage are deleted from the primary storage at a timing, which is asynchronous with the unmount request, by the control of the control device 4.

The control device 4 registers the logical volume for which the mount request is made within a predetermined period of time in the management information 6 as the logical volume which belongs to the same group. For example, it is assumed that a mount request is made for the logical volumes L1 and L2 among the logical volumes L1, L2, and L3 within the predetermined period of time from the host device 5. In this case, the control device 4 registers the logical volumes L1 and L2 in the management information 6 as the logical volumes which belong to the same group. The control device 4 sets the group to which the logical volumes L1 and L2 belong as a group G. The management information 6 is stored in, for example, in the storage device within the control device 4.

The control device 4 allocates the storage area of the primary storage associated with each of the logical volumes which belong to a single group registered in the management information 6 to any one of the first storage devices 2a and 2b such that allocation destinations of the storage area are distributed between the first storage devices 2a and 2b. That is, the data associated with a single logical volume are not stored in an overlapping manner in the first storage devices 2a and 2b, but stored in any one of the first storage devices 2a and 2b. Further, the data of each of the logical volumes which belong to a single group are distributively arranged in the first storage devices 2a and 2b. In the example of FIG. 1, a storage area of the primary storage associated with the logical volume L1 is allocated to the first storage device 2a and a storage area of the primary storage associated with the logical volume L2 is allocated to the first storage device 2b.

Here, the logical volumes L1 and L2 for which the mount request is made within the predetermined period of time has a high possibility that an access frequency from the host device 5 increases within the same period of time after the mount process is completed. This is because, when the mount request timings for the respective logical volumes L1 and L2 are close to each other, the respective logical volumes L1 and L2 have a high possibility of being used by the same user through, for example, a business work within the same period of time.

Therefore, the control device 4 distributively allocates the logical volumes L1 and L2 having a high possibility that the access frequency increases within the same period of time to the first storage devices 2a and 2b. Accordingly, it is possible to increase the possibility that the degree of access parallelism to the first storage devices 2a and 2b in a time period during which the access frequency for both of the logical volumes L1 and L2 increases. Accordingly, it is possible to increase the possibility that the access processing for the storage device is performed at high speed 1 in its entirety in the time period.

Second Embodiment

Next, descriptions will be made on an example of a storage system in which a disk array device is used as each of the first storage devices 2a and 2b of FIG. 1, and a tape library device is used as the second storage device 3 of FIG. 1.

Figure 2:
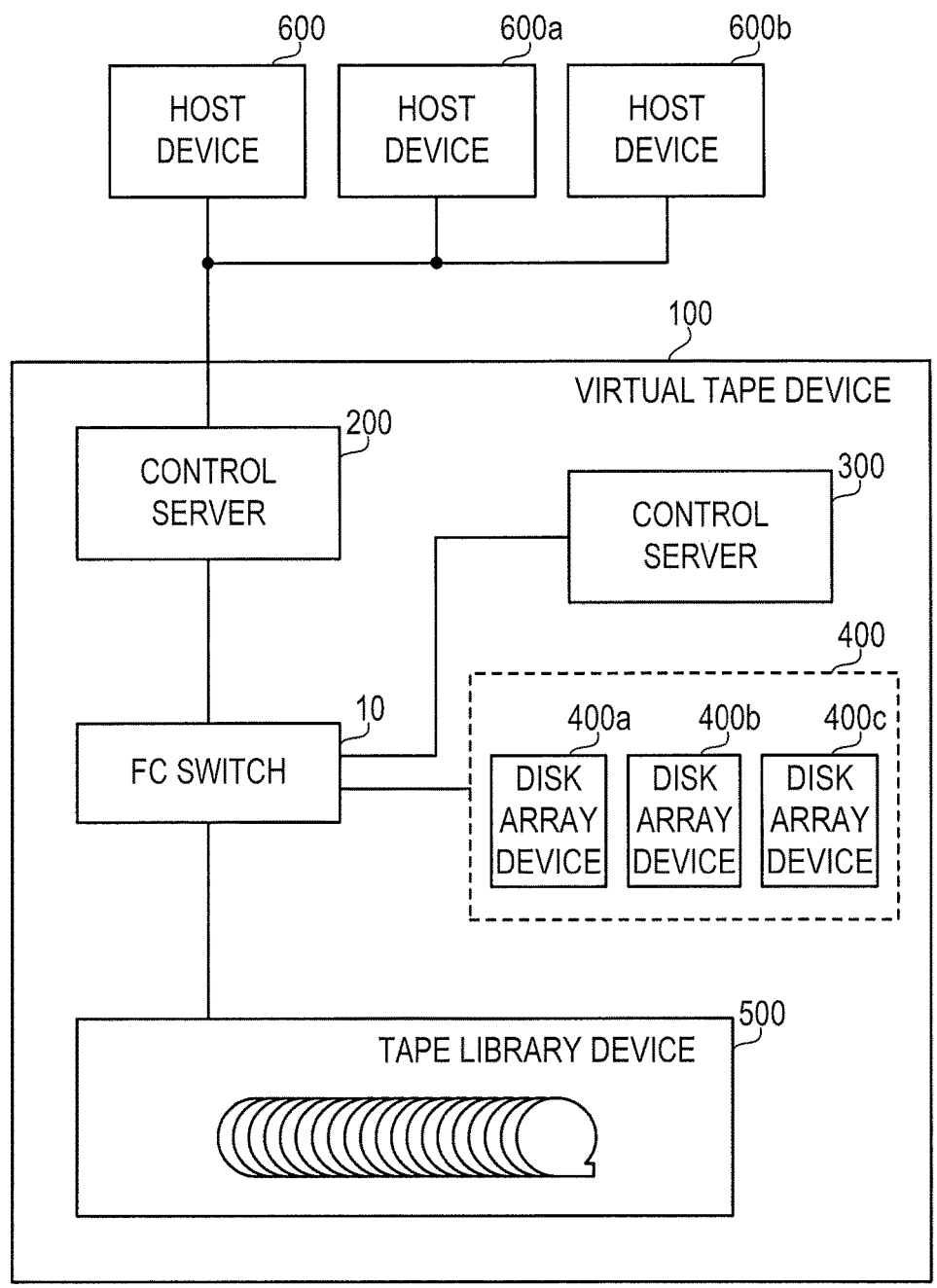
FIG. 2 is a diagram illustrating a storage system according to a second embodiment.

FIG. 2 is a diagram illustrating a storage system according to a second embodiment. The storage system includes a virtual tape device 100 and host devices 600, 600a, and 600b. The virtual tape device 100 includes a control server 200, a control server 300, a disk array device group 400, and a tape library device 500. The control server 200, the control server 300, the disk array device group 400, and the tape library device 500 are connected with each other through a FC (Fibre Channel) switch 10.

The control servers 200 and 300 control the hierarchical virtual storage device in which the tape library device 500 is defined as a secondary storage and the disk array device group 400 is defined as a primary storage (cache device). That is, the virtual tape device 100 is adapted to allow the host devices 600, 600a, and 600b to virtually access a large capacity storage area, which is implemented with the tape library device 500, through the disk array device group 400.

The control server 200 receives a request from the host devices 600, 600a, and 600b and notifies the control server 300 of the content of the request. Further, the control server 200 transfers the data of the logical volume between the host devices 600, 600a, and 600b and the disk array device group 400 under the control of the control server 300. The logical volume refers to a logical storage area provided to a user using a physical storage area of the virtual tape device 100. The host devices 600, 600a, and 600b recognize the logical volume as a magnetic tape (tape volume) mounted on the drive device.

The control server 300 controls the data transfer of the logical volume between the control server 200 and the disk array device group 400 and between the disk array device group 400 and the tape library device 500. The control server 300 allocates the storage area of the logical volume for which the mount request is made to the disk array device provided in the disk array device group 400. Also, the control server 300 controls the access from the host devices 600, 600a, and 600b to the logical volume using the disk array device group 400. Therefore, a high-speed data read and write is implemented without an occurrence of the physical operation of mounting.

The disk array device group 400 includes the disk array devices 400a, 400b, and 400c. The disk array devices 400a, 400b, and 400c function as a cache device of the virtual tape device 100. The disk array devices 400a, 400b, and 400c are provided with a plurality of HDDs as a recording medium implementing a storage area of the cache device. Further, the disk array devices 400a, 400b, and 400c may be provided with a different type of non-volatile the storage device such as an SSD instead of the plurality of HDDs. Further, the storage area of each of the disk array devices 400a, 400b, and 400c is managed as an RAID (Redundant Arrays of Inexpensive Disks) by, for example, the control servers 200 and 300.

The tape library device 500 is a storage device configured with a plurality of magnetic tapes as a recording medium which implements a back end storage area in the virtual tape device 100. As will be described in below, the tape library device 500 includes, for example, a single or a plurality of tape drives which performs data access to the magnetic tape, or a mechanism which conveys a tape cartridge accommodating the magnetic tape.

Further, in addition to the magnetic tape, a different type of portable recording medium such as, for example, an optical disk and an opto-magnetic disk may be used as the recording medium which implements the back end storage area of the hierarchical virtual storage device.

The host devices 600, 600a, and 600b issue an access request according to an input manipulation of the user to the control server 200 so as to access the logical volume defined in the virtual tape device 100.

Here, descriptions will be made on a basic processing in the virtual tape device 100. In the present embodiment, the processing based on a request from the host device 600 will be described as an example, but the descriptions may be similarly applied to a case where the mount request is transmitted from the host devices 600a and 600b.

When the mount request for the logical volume is received from the host device 600, the control server 200 notifies the control server 300 of the reception of the mount request. The control server 300 determines whether the data of the logical volume designated by the mount request are stored in any one of the disk array devices 400a, 400b, and 400c. When it is determined that the data of the logical volume are stored therein, the control server 300 notifies the control server 200 of the completion of mount. In the meantime, when the data of the logical volume are not stored therein, the control server 300 reads the data of the logical volume from the tape cartridge in the tape library device 500 and stores the data into any one of the disk array devices 400a, 400b, and 400c. After the data have been stored, the control server 300 notifies the control server 200 of the completion of the mounting.

When a notification of the completion of the mount is received from the control server 300, the control server 200 notifies the host device 600 of the completion of mount. Accordingly, it becomes possible for the host device 600 to access the logical volume.

For example, when a request to read data located on the logical volume is received from the host device 600, the control server 200 notifies the control server 300 of a received read address and inquires the control server 300 about a storage place on the cache area of the data for which the read request is made. The control server 200 accesses any one of the disk array devices 400a, 400b, and 400c based on the storage place replied from the control server 300, reads the data for which the read request is made, and transmits the data to the host device 600.

Further, for example, when a request to write data into the logical volume is received from the host device 600, the control server 200 notifies the control server 300 of a received write address and inquires the control server 300 about the storage place on the cache area of the data for which the write request is made. The control server 200 writes the data for which the write request is made received from the host device 600 into any one of the disk array devices 400a, 400b, and 400c based on the storage place replied from the control server 300.

Next, when an unmount request for the logical volume is received from the host device 600, the control server 200 notifies the control server 300 of the reception of the unmount request. The control server 300 reads the data of the logical volume designated by the unmount request from any one of the disk array devices 400a, 400b, and 400c, and writes the data into the magnetic tape in the tape cartridge accommodated in the tape library device 500. When the writing of the data into the magnetic tape is completed, the control server 300 notifies the control server 200 of the completion of unmount, and the control server 200 which has received the notification notifies the host device 600 of the completion of unmount.

However, the control server 300 performs the reading and writing of data while maintaining the data of the logical volume for which the unmount is completed (that is, in a state of being unmounted) in any one of the disk array devices 400a, 400b, and 400c. When the size of empty space for each of the disk array devices 400a, 400b, and 400c becomes a predetermined size or less, the control server 300 deletes the data of the logical volume, which has been maintained for a longest period of time after the unmount request has been made for the logical volume, among the logical volumes which are in a state of being unmounted on the corresponding disk array device, from the disk array device.

Figure 3:
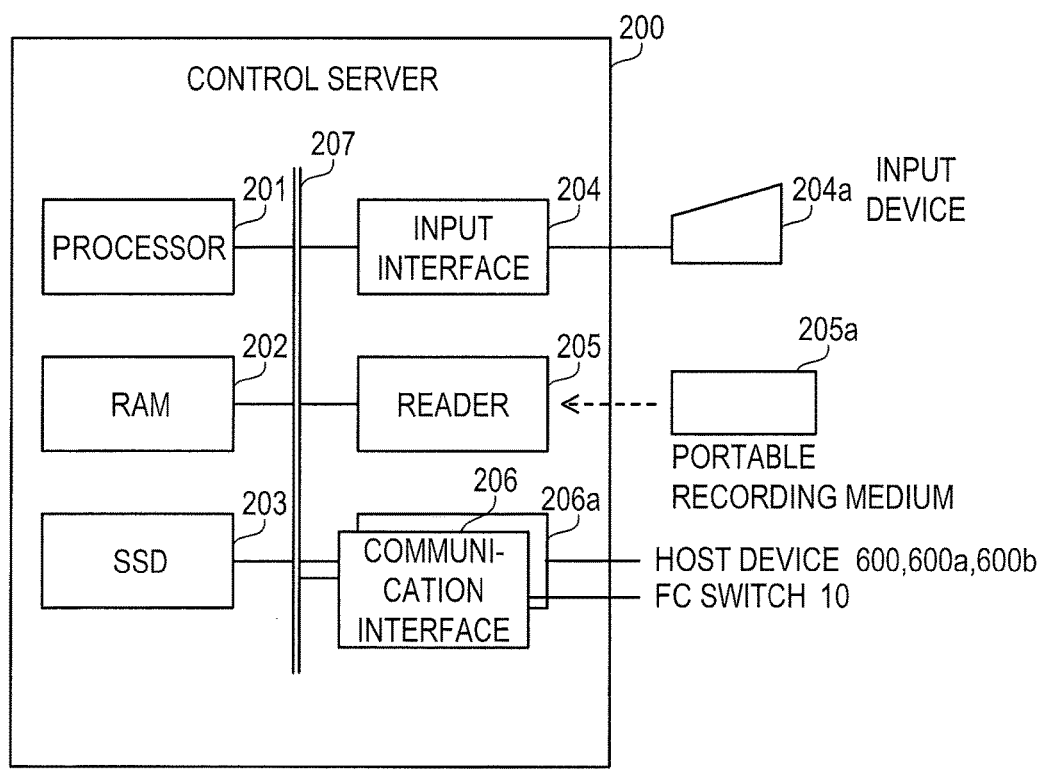
FIG. 3 is a diagram illustrating an example of hardware of a control server.

FIG. 3 is a diagram illustrating an example of hardware of a control server. The control server 200 is implemented by, for example, a computer as illustrated in FIG. 3. The control server 200 is controlled by a processor 201 in its entirety. The processor 201 may be a multiprocessor. The processor 201 may be, for example, a CPU (Central Processing Unit), an MPU (Micro Processing Unit), a DSP (Digital Signal Processor), an ASIC (Application Specific Integrated Circuit), or a PLD (Programmable Logic Device). Further, the processor 201 may be a combination of two or more of the CPU, MPU, DSP, ASIC, and PLD.

The processor 201 is connected with an RAM 202, an SSD 203, an input interface 204, a reader 205, and communication interfaces 206 and 206a via a bus 207.

The RAM 202 is used as a main storage device of the control server 200. At least a portion of a firmware program to be executed by the processor 201 is temporarily stored in the RAM 202. Further, various data necessary for the processing by the processor 201 are stored in the RAM 202.

The SSD 203 is used as a secondary storage device of the control server 200. The firmware program and various data are stored in the SSD 203. Further, a different type of non-volatile storage device such as the HDD may be used as the secondary storage device.

The input interface 204 is connectable with the input device 204a provided with, for example, various manipulation keys. The input interface 204 transmits signal from the input device 204a to the processor 201 via the bus 207. Further, the input device 204a may be installed on the control server 200.

The portable recording medium 205a may be detached and attached from and to the reader 205. The reader 205 reads the data written into the portable recording medium 205a and transmits the data to the processor 201. The portable recording medium 205a may include, for example, an optical disk, an opto-magnetic disk, and a semiconductor memory.

The communication interface 206 is an interface to transmit and receive data to and from an FC switch 10. The communication interface 206a is an interface to transmit and receive data to and from the host devices 600, 600a, and 600b.

Further, the control server 300 and the host devices 600, 600a, and 600b are also implemented with the same hardware as the control server 200.

Figure 4:
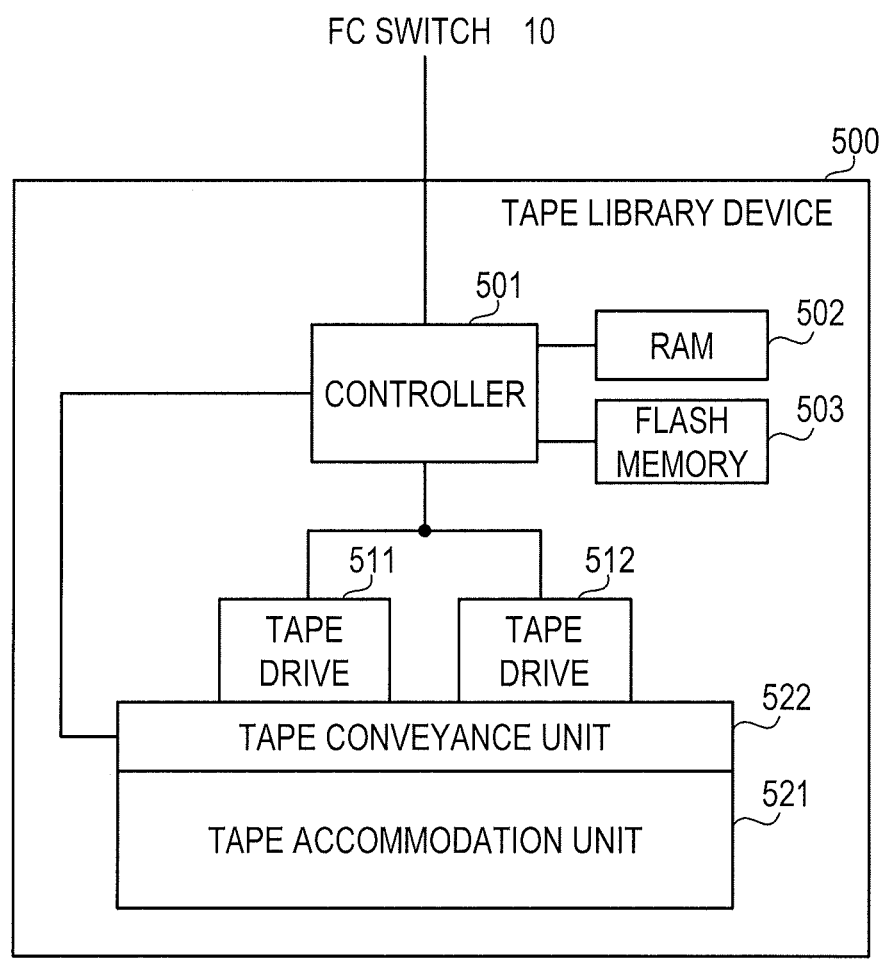
FIG. 4 is a diagram illustrating an example of hardware of a tape library device.

FIG. 4 is a diagram illustrating an example of a hardware configuration of a tape library device. The tape library device 500 includes a controller 501, an RAM 502, a flash memory 503, tape drives 511 and 512, a tape accommodation unit 521, and a tape conveyance unit 522.

The controller 501 includes, for example, a CPU and collectively and comprehensively controls the tape library device 500 in its entirety. At least a portion of a firmware program to be executed by the controller 501 is temporarily stored in the RAM 502. Further, various data necessary for the processing by the controller 501 are stored in the RAM 502.

Each of the tape drives 511 and 512 mounts the tape cartridges conveyed by the tape conveyance unit 522 one by one, and writes the data into the magnetic tape in the mounted tape cartridge or reads the data from the magnetic tape under the control of the controller 501. Further, the number of tape drives included in the tape library device 500 is not particularly limited.

A plurality of tape cartridges is accommodated in the tape accommodation unit 521. The tape conveyance unit 522 conveys the tape cartridge under the control of the controller 501. The tape conveyance unit 522 conveys, for example, the tape cartridge accommodated in the tape accommodation unit 521 to any one of the tape drives 511 and 512 to be mounted. Further, the tape conveyance unit 522 unmounts the tape cartridge from any one of the tape drives 511 and 512, and conveys the tape cartridge into the tape accommodation unit 521 to be accommodated therein.

Figure 5:
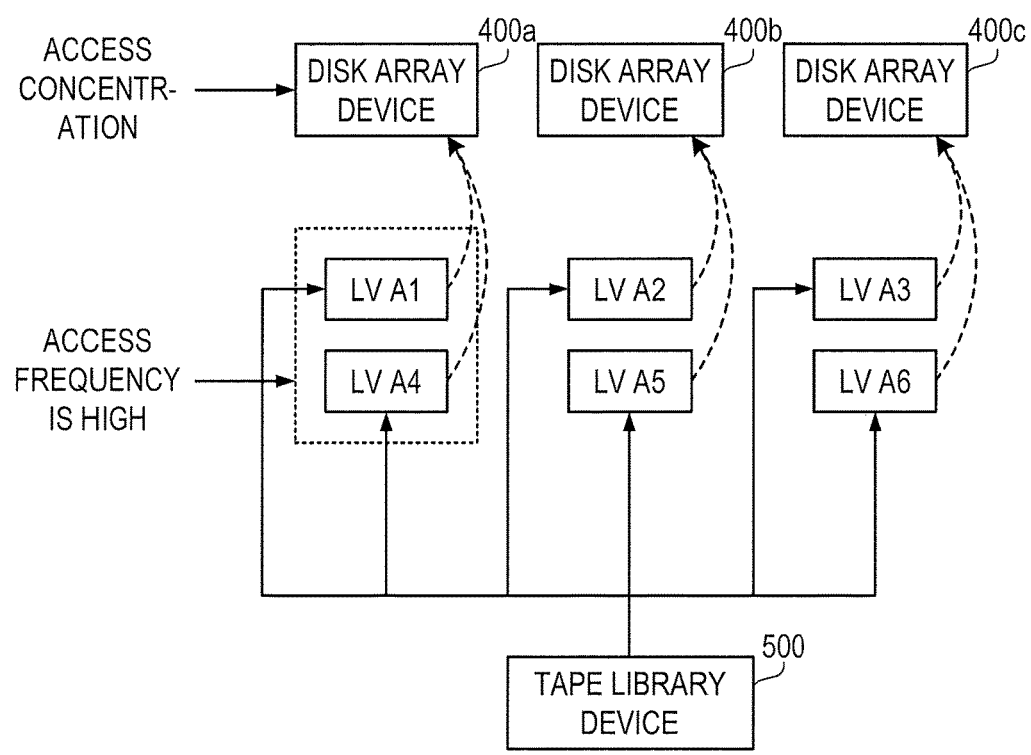
FIG. 5 is a diagram illustrating a problem in a method of arranging logical volumes in a disk array device.

FIG. 5 is a diagram illustrating a problem in a method of arranging logical volumes into a disk array device. Further, the expression of "arranging logical volume into a disk array device" refers that a storage area (cache area) of a logical volume is allocated to a storage area of a disk array device.

It is assumed that the logical volumes A1, A2, A3, A4, A5, and A6 (denoted as "LV" in FIG. 5) are stored in the tape library device 500. The control server 300 controls reading of the logical volume designated by the mount request from the tape library device 500 each time when the mount request is received from any one of the host devices 600, 600a, and 600b via the control server 200. Here, a case is considered where the control server 300 simply distributes the logical volumes A1, A2, A3, A4, A5, and A6 to be arranged in any one of the disk array devices 400a, 400b, and 400c. For example, the control server 300 arranges the logical volumes A1 and A4 in the disk array device 400a. The control server 300 arranges the logical volumes A2 and A5 in the disk array device 400b. The control server 300 arranges the logical volumes A3 and A6 in the disk array device 400c.

As described above, when the logical volumes A1, A2, A3, A4, A5, and A6 are simply distributed to be arranged in any one of the disk array devices 400a, 400b, and 400c, a period of time during which accesses are concentrated onto a single disk array device may occur. This is because a frequency and transition of access to each logical volume are different for each logical volume. For example, when the access frequency to the logical volume A1 and the logical volume A4 is higher than the access frequency to the logical volumes A2, A3, A5, and A6 in a predetermined period of time, accesses are concentrated on the disk array device 400a. Since a degree of access parallelism to each of the disk array devices 400a, 400b, and 400c is decreased during the period of time, responsiveness with respect to the access request issued from the host device is decreased. As described above, when the logical volumes A1, A2, A3, A4, A5, and A6 are simply distributed to be arranged in the disk array devices 400a, 400b, and 400c, a period of time during which the responsiveness with respect to the access request issued from the host device is temporarily decreased may occur.

Accordingly, in the second embodiment, the logical volumes having a high possibility that the access frequency is increased within the same period of time are distributed in the respective disk array devices base on a mount request timing, such that accesses are prevented from being concentrated on a single disk array device. Since the frequency of access to a plurality of disk array devices performed in parallel is increased by employing the access distribution method described above, it is possible to increase the possibility that the access processing is performed at a high speed.

Figure 6:
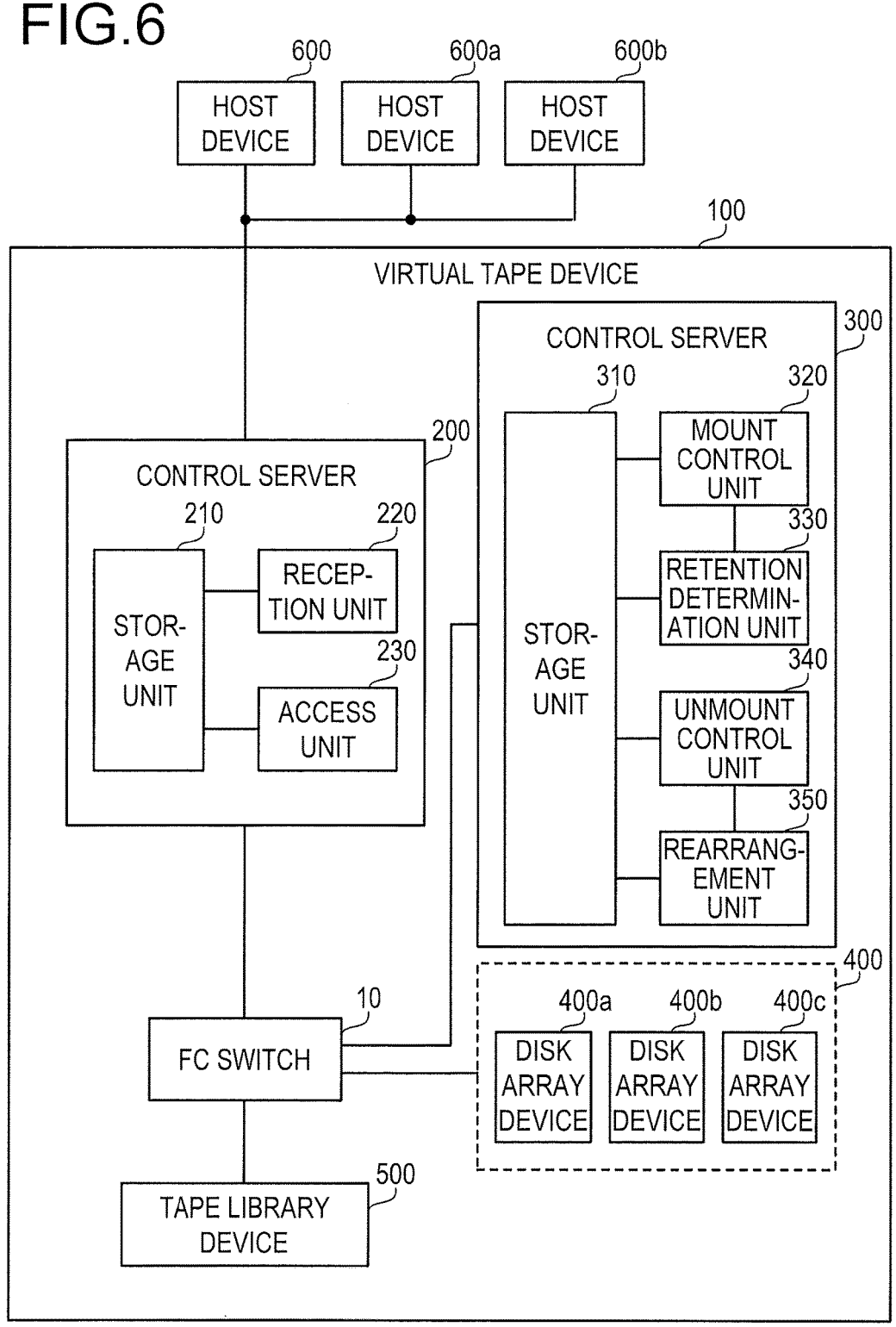
FIG. 6 is a diagram illustrating an example of functionalities of a storage system.

FIG. 6 is a diagram illustrating an example of functionalities of a storage system. The control server 200 includes a storage unit 210, a reception unit 220, and an access unit 230. The storage unit 210 stores information used for the processing performed by the reception unit 220 and the access unit 230. The storage unit 210 temporarily stores a mount request, an unmount request, and a request to read and write logical volume transmitted from the host devices 600, 600a, and 600b.

The reception unit 220 receives the mount request and the unmount request from the host devices 600, 600a, and 600, and stores the received mount request and unmount request in the storage unit 210. The reception unit 220 transmits the mount request and the unmount request to the control server 300.

When a read request or a write request for the logical volume is received from any one of the host devices 600, 600a, and 600b, the access unit 230 inquires of the control server 300 about a read position or a write position on the disk array device. Since a cache management table to be described below is included in the control server 300 and the cache management table represents an association relationship between the logical volume and the disk array device, the control server 300 transmits the read position or the write position to the control server 200 in accordance with the inquiry. Also, the access unit 230 accesses the disk array device based on the received read position or write position to transmit the read data from the disk array device to any one of the host devices 600, 600a, and 600b, or write the data to be written received from any one of the host devices 600, 600a, and 600b.

The control server 300 includes a storage unit 310, a mount control unit 320, a retention determination unit 330, an unmount control unit 340, and a rearrangement unit 350. The storage unit 310 stores information used for the processing of the mount control unit 320, the retention determination unit 330, the unmount control unit 340, and the rearrangement unit 350. The storage unit 310 stores a group management table, a cache management table, and a volume management table. The information indicating an association relationship between the group and the logical volume is registered in the group management table. The information indicating an association relationship between the logical volume and the disk array device is registered in the cache management table. The information indicating an association relationship between the logical volume and the tape cartridge accommodated in the tape library device 500 is registered in the volume management table.

In a case where the data of the logical volume designated by the mount request are not stored in any of the disk array devices 400a, 400b, and 400c when the mount request is received from the reception unit 220, the mount control unit 320 performs a read control for the logical volume designated by the mount request issued from the tape library device 500a. Further, when the data of the logical volume designated by the mount request are stored in any of the disk array devices 400a, 400b, and 400c, the mount control unit 320 does not performs the read control for the logical volume designated by the mount request to the tape library device 500.

The mount control unit 320 groups the logical volumes for which the mount request is made within a predetermined period of time. Here, the logical volumes designated by the mount request within the predetermined period of time has a possibility that a frequency of access from at least one of the host devices 600, 600a, and 600b is increased within almost the same period of time after being mounted. Accordingly, the logical volumes are grouped as indicators having a possibility that the access frequency is increased within the same period of time. In the present embodiment, the mount control unit 320 groups the logical volumes for which the mount request is made within a predetermined period of time from the same host device.

The retention determination unit 330 determines whether the group registered in the group management table may be retained. Here, a relationship between the logical volumes which belong to the group varies over a time. Therefore, the retention determination unit 330 determines whether the grouped logical volumes have a possibility that the access frequency is increased within the same period of time. When it is determined that the possibility is low, the retention determination unit 330 releases the group.

When a request to unmount is received from the reception unit 200, the unmount control unit 340 reads the data of the logical volume designated by the unmount request from any one of the disk array devices 400a, 400b, and 400c. The unmount control unit 340 writes the read data of the logical volume into the tape library device 500. In this case, the unmount control unit 340 does not delete the logical volume designated by the unmount request and stored in any one of the disk array devices 400a, 400b, and 400c.

The rearrangement unit 350 rearranges the logical volumes which belong to the group to be distributed in each disk array device after unmounting of the logical volume is ended. When a new disk array device is added, the rearrangement unit 350 rearranges the logical volumes which belong to the group to be distributed in the new disk array device and the disk array devices 400a, 400b, and 400c.

FIG. 7 is a diagram illustrating an example of a group management table. A group management table 311 is stored in the storage unit 310. The group management table 311 includes items for a host name, a group name, a group flag, a volume name, a volume flag, and a mount request time.

The name of a host device of a mount request source is registered in the item of host name. The name of a group is registered in the item of group name. The information indicating whether a group includes a logical volume for which the remount request is made is registered in the item of group flag. The request to remount is received by the control server 200 from any one of the host devices after the unmounting is performed and corresponds to a mount request for the same logical volume. The name of a logical volume is registered in the item of volume name. The information indicating whether a logical volume corresponds to the logical volume for which the remount request is made is registered in the item of volume flag. The time at which the mount request for the logical volumes, which belong to the group, is received latest by the control server 300 is registered in the item of mount request time.

Here, it is assumed that the host name of the host device 600 is "H1," the host name of the host device 600a is "H2," and the host name of the host device 600b is "H3." For example, the information that contains the host name of "H1," the group name of "G1," the group flag of "true," the volume name of "X1," the volume flag of "true," and the mount request time of "T1" is registered in the group management table 311. This indicates that the group "G1" to be accessed by the host name "H1" is a group (true) which includes a logical volume for which the remount request is made. It is indicated that the logical volume "X1" belongs to the group "G1" and the logical volume "X1" is a logical volume (true) for which the remount request is made. Further, it is indicated that the time at which the mount request is received latest by the control server 300 is "T1."

FIG. 8 is a diagram illustrating an example of a cache management table. A cache management table 312 is stored in the storage unit 310. The cache management table 312 includes items for a disk array name, a volume name, a mount status flag, and a cache retention flag.

The name of a disk array device is registered in the item of disk array name item. The name of a logical volume is registered in the item of volume name. The information indicating whether a logical volume is in a state of being mounted is registered in the item of mount status flag. The information indicating whether a logical volume is retained in the disk array device mounted is registered in the item of cache retention flag.

Here, it is assumed that the name of the disk array device 400a is "D1," the name of the disk array device 400b is "D2," and the name of the disk array device 400c is "D3." For example, the information that contains the disk array name of "D1," the volume name of "X11," the mount status flag of "false," and the cache retention flag of "true" is registered in the cache management table 312. This indicates that the logical volume "X11" which belongs to the disk array name "D1" is in a state of being unmounted (that is, the mount status flag is "false"), but the corresponding data are retained in the disk array name "D1" (that is, the cache retention flag is "true").

FIG. 9 is a diagram illustrating an example of a volume management table. A volume management table 313 is stored in the storage unit 310. The volume management table 313 includes items for a volume name and a write destination tape name. A name of a logical volume is registered in the item of volume name. A name of a tape cartridge is registered in the item of write destination tape name.

For example, the information that contains the volume name of "X1," and the write destination tape name of "TP1" is registered in the volume management table 313. This indicates that the name of tape in which the volume name "X1" is written is "TP1."

Figure 10:
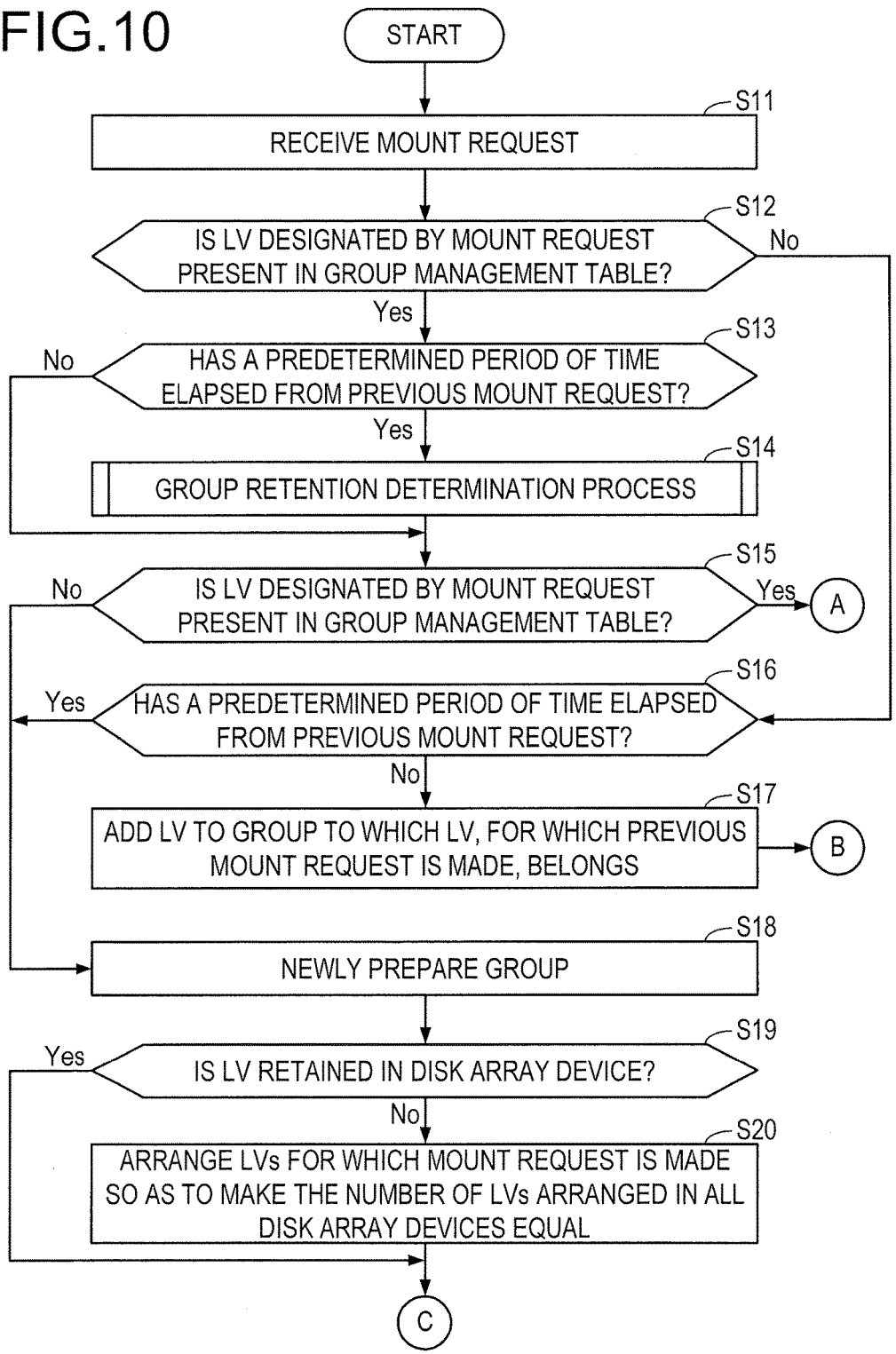
FIG. 10 is a flowchart illustrating an (first) example of a mount request process.

FIG. 10 is a flowchart illustrating an (first) example of a mount request process. The process of FIG. 10 is started after the reception unit 220 receives a request mount for the logical volume from any one of the host devices 600, 600a, and 600b and transmits the mount request to the control server 300.

The mount control unit 320 receives the mount request for the logical volume (S11). The mount control unit 320 temporarily stores information of the time at which the mount request is received (hereinafter, it may be denoted as the time at which the current mount request is received) in the storage unit 310. Further, the time at which the mount request is received may be a time at which the mount request is received by the reception unit 220. The mount control unit 320 notifies the retention determination unit 330 of the reception of the mount request.

The retention determination unit 330 determines whether the logical volume designated by the mount request is present among the group associated with the host device of the mount request source at Operation S11 in the group management table 311 (S12). When it is determined that the logical volume designated by the mount request is present, the process proceeds to Operation S13. When it is determined that the logical volume designated by the mount request is not present, the retention determination unit 330 notifies the mount control unit 320 that the group of the logical volumes designated by the mount request is not present. Then, the process proceeds to Operation S16.

The retention determination unit 330 refers to the mount request time associated with the host device of the mount request source at Operation S11 in the group management table 311 and specifies the mount request closest to the time at which the current mount request is received (S13). The mount control unit 320 compares the specified mount request time and the time at which the current mount request is received, and determines whether a predetermined period of time has elapsed. When it is determined that the predetermined period of time has elapsed, there is a possibility that the relationship between the logical volumes which belong to the group generated regarding the mount request source is weakened. That is, there is a possibility that the access frequency to the logical volumes which belong to the group is increased and reliability of information about the registration of the group is lowered. The process proceeds to Operation S14 in order for the retention determination unit 330 to determine whether the group is to be retained or not. When it is determined that the predetermined period of time has not been elapsed, the process proceeds to Operation S15.

The retention determination unit 330 performs a group retention determination process (S14). The retention determination unit 330 releases a registered group in which the relationship between the logical volumes is lowered. The retention determination unit 330 notifies the mount control unit 320 of the completion of the group retention determination process.

The mount control unit 320 determines whether the logical volume designated by the mount request is present in the group management table 311 (S15). When it is determined that the logical volume designated by the mount request is present, the process proceeds to Operation S21. When it is determined that the logical volume designated by the mount request is not present, the process proceeds to Operation S18 in order to prepare a new group because the group to which the logical volumes designated by the mount request belong is released in the group retention determination process.

The retention determination unit 330 refers to the mount request time associated with the host device of the mount request source at Operation S11 in the group management table 311 and specifies the mount request closest to the time at which the current mount request is received (S16). The mount control unit 320 compares the specified mount request time and the time at which the current mount request is received and determines whether a predetermined period of time has elapsed. When it is determined that the predetermined period of time has elapsed, the process proceeds to Operation S18. When it is determined that the predetermined period of time has not been elapsed, there is a possibility that the access frequencies to the logical volume for which the mount request is made at previous time from the same host device and the logical volume designated by the current mount request are increased within the same period of time. Therefore, the process proceeds to Operation S17 in order for the mount control unit 320 to allow the logical volume for which the mount request is made at previous time and the logical volume designated by the current mount request to belong to the same group.

The mount control unit 320 adds a logical volume designated by the current mount request to the group to which the logical volume belongs associated with the mount request time specified at Operation S16 among the groups registered in the group management table 311 (S17). The mount control unit 320 registers the addition of the logical volume designated by the current mount request in the group management table 311. Then, the process proceeds to Operation S22.

The mount control unit 320 newly prepares a group to which the logical volume designated by the mount request belongs (S18). The mount control unit 320 associates the prepared group with the host device of the mount request source to be registered in the group management table 311. In this case, the value "false" is registered in the items for group flag and volume flag, and the name of the logical volume designated by the mount request is registered in the item for volume name, regarding the prepared group.

The mount control unit 320 refers to the cache retention flag of the cache management table 312 and determines whether the logical volume designated by the mount request is retained in any of the disk array devices 400a, 400b, and 400c (S19). When it is determined that the logical volume designated by the mount request is retained, the process proceeds to Operation S25. Otherwise, when it is determined that the logical volume is not retained, the process proceeds to Operation S20.

The mount control unit 320 refers to the volume management table 313 and specifies the tape cartridge in which the data of the logical volume designated by the mount request is stored (S20). The mount control unit 320 requests the tape library device 500 to read data from the specified tape cartridge and reads the data of the logical volume from the specified tape cartridge. In this case, the mount control unit 320 refers to the cache management table 312 and determines which disk array device the read logical volume is to be allocated for arranging the read logical volume in order to make the number of logical volumes arranged in the respective disk array devices 400a, 400b, and 400c to be equal.

For example, when two logical volumes are arranged in the disk array device 400a, two logical volumes are arranged in the disk array device 400b, and one logical volume is arranged in the disk array device 400c, the mount control unit 320 arranges the read logical volume in the disk array device 400c. The mount control unit 320 registers information about the read logical volume in the cache management table 312. Specifically, the mount control unit 320 newly registers the logical volume in the disk array device in which the read logical volume is arranged and sets the value "true" in the items for mount status flag and cache retention flag. Then, the process proceeds to Operation S25.

Figure 11:
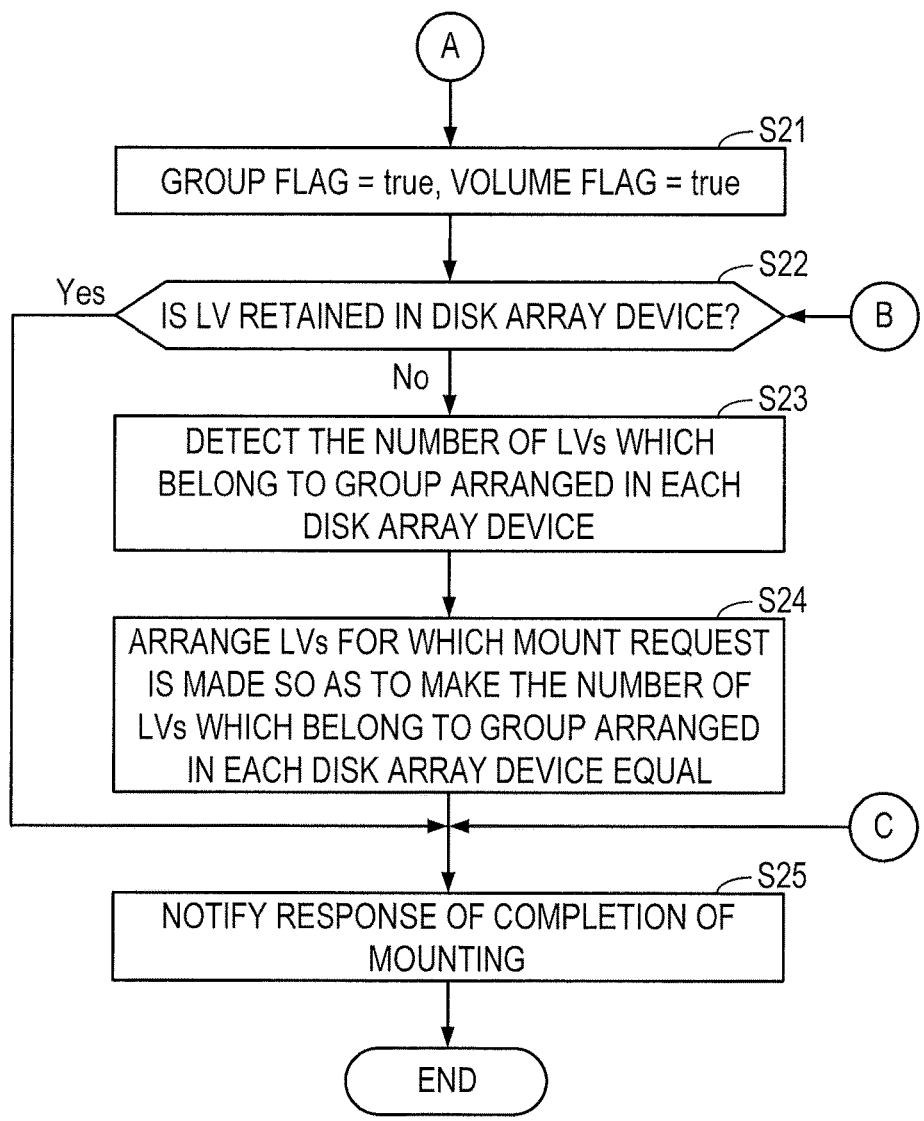
FIG. 11 is a flowchart illustrating an (second) example of a mount request process.

FIG. 11 is a flowchart illustrating an example (second) of a mount request process. In the following, the process illustrated in FIG. 11 will be described along with Operation numbers. The mount control unit 320 sets the value "true" in the group flag of the group to which the logical volume designated by the mount request belongs among the groups associated with the host device of the mount request source at Operation S11 in the group management table 311 (S21). Further, the mount control unit 320 sets the value "true" in the volume flag which is in association with the logical volume designated by the mount request belongs among the groups associated with the host device of the mount request source at Operation S11 in the group management table 311.

The mount control unit 320 refers to the cache retention flag of the cache management table 312 and determines whether the logical volume designated by the mount request is retained in any one of the disk array devices 400a, 400b, and 400c (S22). When it is determined that the logical volume designated by the mount request is retained, the process proceeds to Operation S25. Otherwise, when it is determined that the logical volume is not retained, the process proceeds to Operation S23.

The mount control unit 320 detects the number of the logical volumes which belong to the group arranged in each of the disk array devices 400a, 400b, and 400c regarding the group to which the logical volumes designated by the mount request belongs, based on the group management table 311 and the cache management table 312 (S23). Further, the group to which the logical volumes designated by the mount request belong corresponds to the group specified at Operation S15 or added at Operation S17.

The mount control unit 320 refers to the volume name of the volume management table 313 and reads the data of the logical volume designated by the mount request from the tape library device 500 in the same sequence as Operation S20 (S24). The mount control unit 320 arranges the read logical volumes such that the number of the logical volumes to be arranged in each of the disk array devices 400a, 400b, and 400c becomes equal regarding the group to which the logical volumes designated by the mount request belong, based on the detection result of the number of the logical volumes at Operation S23.

For example, when two logical volumes are arranged in the disk array device 400a, two logical volumes are arranged in the disk array device 400b, and one logical volume is arranged in the disk array device 400c, among the logical volumes that belong, regarding the group to which the logical volumes designated by the mount request belong, the mount control unit 320 arranges the read logical volumes in the disk array device 400c.

The mount control unit 320 registers information about the read logical volume in the cache management table 312. Specifically, the mount control unit 320 newly registers the logical volume in the disk array device in which the read logical volume is arranged and sets the value "true" in the items for mount status flag and cache retention flag.

The mount control unit 320 notifies the control server 200 of a response of the completion of mounting (S25). The reception unit 220 transmits the response of the completion of mounting to the host device which has made the mount request. Further, the mount control unit 320 registers information of the time, at which the current mount request is received and which is stored in the storage unit 310 at Operation S11, in the item of mount request time of the group management table 311 which is in association with the group to which the logical volume designated by the current mount request belongs. Also, the process is ended. Further, the group to which the logical volume designated by the current mount request belongs corresponds to the group specified at Operation S15, added at Operation S17 or newly prepared at Operation S18.

As described above, the mount control unit 320 groups the logical volumes for which the mount request is made from the same host device within a predetermined period of time. The logical volumes for which the mount request is made from the host device within the predetermined period of time have a possibility that the access frequency is increased within the same period of time. Accordingly, the grouped logical volumes are distributively arranged in the disk array devices 400a, 400b, and 400c such that a degree of parallelism for access processings between the disk array devices is increased. As a result, the access processing speed of entire the virtual tape device 100 is increased in its entirety.

Further, a case where the data of logical volume designated by the mount request are not present in any of the disk array devices 400a, 400b, and 400c ("NO" at Operation S22) is employed as a timing at which the process of distributing the grouped logical volumes is executed. In this case, the data of the designated logical volume are read from the tape library device 500 and stored in any one of the disk array devices 400a, 400b, and 400c, but a processing time is not changed regardless of the disk array device intended to store the data. Accordingly, the mount control unit 320 determines a data storing destination of the logical volume read at this timing such that the logical volumes which belong to the group is distributed between the disk array devices. Accordingly, an arrangement destination of the logical volumes is capable of being appropriated without requiring an unnecessary time.

Figure 12:
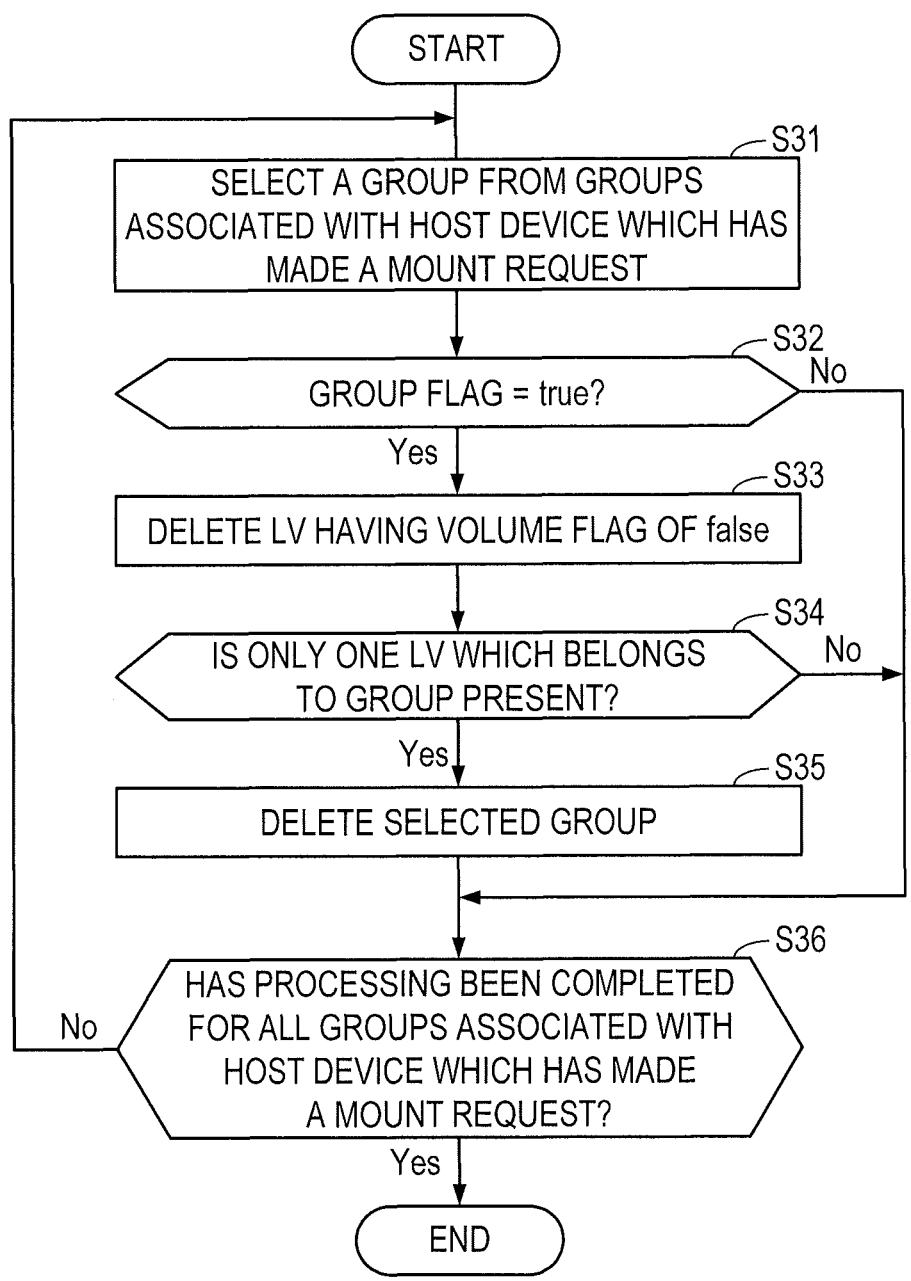
FIG. 12 is a flowchart illustrating an example of a group retention determination process.

FIG. 12 is a flowchart illustrating an example of a group retention determination process. In the following, the process illustrated in FIG. 12 will be described along Operation numbers. The process illustrated in FIG. 12 corresponds to the processing of Operation S14.

The retention determination unit 330 refers to the host name and the group name of the group management table 311 and selects a group from the groups associated with the host device which has made the mount request (S31). For example, when the host device 600 has made the mount request, the retention determination unit 330 specifies groups G1 and G2 associated with the host device 600 (of which host name is H1) from the group management table 311 illustrated in FIG. 7. The retention determination unit 330 selects the group G1 among the specified groups.

The retention determination unit 330 refers to the group flag of the group management table 311 and determines whether the group flag of the group selected at Operation S31 is "true" (S32). When it is determined that the group flag is "true," the process proceeds to Operation S33. Otherwise, when it is determined that the group flag is not "true," the process proceeds to Operation S36.

The retention determination unit 330 deletes the logical volume, which has the volume flag of "false" associated with the logical volume which belongs to the group selected at Operation S31, from the group management table 311 (S33). Accordingly, on the accounts of the following reasons, the logical volumes having a weak relationship among the logical volumes which belong to the group are deleted from the group such that the logical volumes having a strong relationship are remained in the group.

The retention determination unit 330 determines whether only one logical volume of the logical volumes which belong to the group selected at Operation S31 is present (S34). When it is determined that only one logical volume is present, the process proceeds to Operation S35. Otherwise, when it is determined that two or more logical volumes are present, the process proceeds to Operation S36.

The retention determination unit 330 deletes the group selected at Operation S31 from the group management table 311 (S35). Due to the deletion of the group, the only one logical volume which belonged to the deleted group is also deleted by the retention determination unit 330.

The retention determination unit 330 refers to the host name and the group name of the group management table 311 and determines whether the process has been completed for all the groups associated with the host device which made the mount request (S36). When it is determined that the process has been completed for all the groups, the process is ended. Otherwise, when it is determined that the process has not been completed for all the groups, the process proceeds to Operation S31.

In the process of FIG. 12 as described above, the logical volumes for which a remount request has been made are deleted from each of the groups associated with the host device, for which a predetermined period of time or more has elapsed until the current mount request is made after the previous mount request, at Operation S33 and the logical volume for which the remount request has never been made are remained. Here, in a case where an access request from the same host device has not been made for a long period of time and a logical volumes for which the remount request has been made and a logical volumes for which the remount request has never been made are present within the same group, there is a possibility that a difference in the mount request timing after being registered in the group is high between the former logical volume and the latter logical volume and thus, it is considered that the relationship between these logical volumes is weak. Further, the logical volume for which remounting has never been requested after being registered in the group has a possibility that the mount request is made again in the near timing. Therefore, the logical volume for which the remount request has never been made is deleted from the group at Operation S33.

Accordingly, the contents of the group management table 311 may be appropriated and load of accessing may be accurately distributed to the disk array devices 400a, 400b, and 400c.

Figure 13:
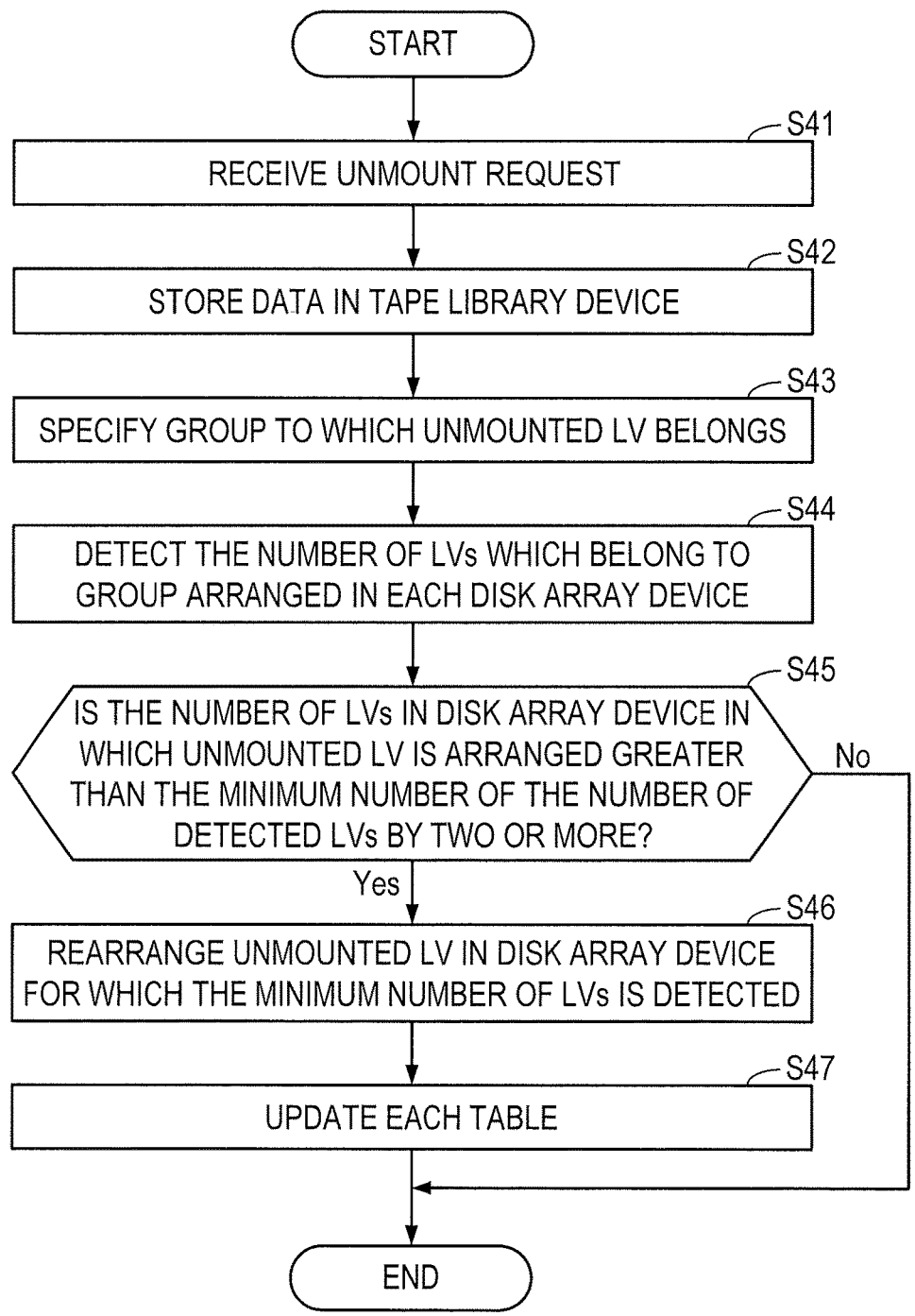
FIG. 13 is a flowchart illustrating an example of an unmount request process.

FIG. 13 is a flowchart illustrating an example of an unmount request process. In the following, the process illustrated in FIG. 12 will be described along Operation numbers. The process of FIG. 13 is started after the reception unit 220 receives the unmount request for the logical volume from any one of the host devices 600, 600a, and 600b and transmits the unmount request to the control server 300.

The unmount control unit 340 receives the unmount request (S41). For example, the unmount control unit 340 receives the unmount request for a logical volume Y1 (S42). The unmount control unit 340 refers to the disk array name and the volume name of the cache management table 312 and specifies the disk array device in which the logical volume designated by the unmount request is arranged. Further, the unmount control unit 340 requests the tape library device 500 to write the data. According to the request, the tape cartridge is mounted on any one of the tape drives 511 and 512 in the tape library device 500.

The unmount control unit 340 reads the data of the logical volume designated by the unmount request from the specified disk array device. The unmount control unit 340 transmits the read logical volume to the tape library device 500. Further, in this case, the unmount control unit 340 does not delete the data of the logical volume from the disk array device in which the logical volume designated by the unmount request is arranged. The tape library device 500 writes the transmitted logical volume into the magnetic tape within the mounted tape cartridge. The tape library device 500 transmits information of the tape cartridge in which the logical volume is written to the unmount control unit 340. The unmount control unit 340 registers the association relationship between the logical volume written into the tape library device 500 and the tape cartridge in which the logical volume is written in the volume management table 313.

The unmount control unit 340 notifies the control server 200 of the response of the completion of unmounting. The reception unit 220 transmits the response of the completion of unmounting to the host device which has made the unmount request. Further, the unmount control unit 340 notifies the rearrangement unit 350 of the completion of unmounting.

The rearrangement unit 350 refers to the group name and the volume name of the group management table 311 and specifies the group in which the logical volume designated by the unmount request is arranged (S43). The rearrangement unit 350 refers to the cache management table 312 and detects the number of logical volumes which belong to the group specified at Operation S43 and is arranged in each of the disk array devices 400a, 400b, and 400c (S44).

The rearrangement unit 350 determines whether the number of arranged logical volumes in the disk array device, in which the unmounted logical volumes are arranged, detected at Operation S44 is greater than the smallest number of the number of arranged logical volumes in other disk array device detected at Operation S44 by two or more (S45).

For example, the disk array device in which the unmounted logical volumes are arranged is set as the disk array device 400a. Further, it is assumed that the number of arranged logical volumes included in the group to which the logical volumes designated by the unmount request belong was 5 (five) for the disk array device 400a, 4 (four) for the disk array device 400b, and 2 (two) for the disk array device

400c. The rearrangement unit 350 specifies the disk array device 400c having the smallest number of logical volumes which belong to the group as a disk array device other than the disk array device 400a. The rearrangement unit 350 determines that the number of logical volumes (five logical volumes) which belong to the group arranged in the disk array device 400a is greater than the number of logical volumes (two logical volumes) which belong to the group arranged in the disk array device 400c by two or more. When it is determined that the number of logical volumes arranged in the disk array device 400a is greater than those arranged in the disk array device 400c by two or more, the process proceeds to Operation S46. Otherwise, when the difference in the numbers of logical volumes arranged in the disk array devices 400a and 400c is one or less, the process is ended.

The rearrangement unit 350 rearranges the unmounted logical volume in the disk array device for which the number of arranged logical volumes is determined as the smallest number at Operation S45 (S46). Accordingly, the data of the unmounted logical volume are moved.

The rearrangement unit 350 registers information about the logical volume rearranged in the cache management table 312 (S47). Specifically, the rearrangement unit 350 newly registers the logical volume in the rearranged disk array device and sets the "false" and "true" to the mount status flag and the cache retention flag, respectively. Further, the rearrangement unit 350 deletes the information about the logical volume registered in the disk array device before being rearranged. Then, the process is ended.

With the configuration as described above, since the logical volumes which belong to the group are distributively rearranged in each disk array device such that the frequency of access to each disk array device in parallel is increased, it is possible to increase the possibility that the access processing may be performed at high speed.

Further, according to the process illustrated in FIG. 13, a timing at which the unmount request is made for the logical volumes which belong to the group is employed as a processing timing at which the grouped logical volumes distributed is executed. In this case, an access from the host device to the logical volume is not performed. Therefore, even when the data of the logical volume are moved between the disk array devices, no influence is exerted by the data movement on the access processing from the host device to the logical volume. Accordingly, rearranging of the logical volumes is performed at that timing such that an arrangement destination of the logical volume may be appropriated without exerting an influence on the access processing to the logical volume.

Next, descriptions will be made on a process for a case where a disk array device is newly added.

Figure 14:
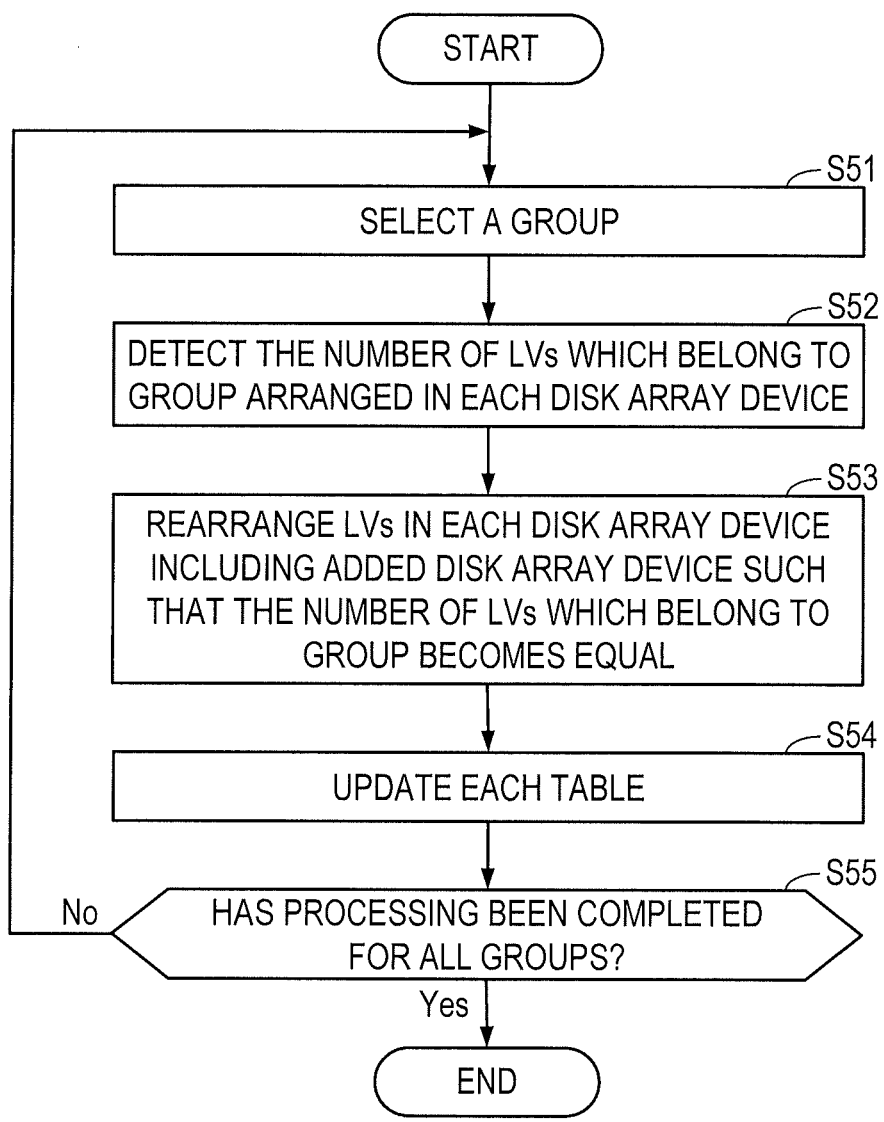
FIG. 14 is a flowchart illustrating an example of a process for a case where a disk array device is added.

FIG. 14 is a flowchart illustrating an example of a process executed for a case where a disk array device is added. In the following, the process illustrated in FIG. 14 will be described along with Operation numbers. The process of FIG. 14 is started after the control server 300 has detected an added disk array device, or the completion of addition of the disk array device is notified to the control server 300 from a management terminal which is not illustrated.

The rearrangement unit 350 refers to the group name of the group management table 311 and selects a single group (S51). The selection of the group performed at Operation S51 targets all the group names registered in the group management table 311.

The rearrangement unit 350 refers to the cache management table 312 and detects the number of logical volumes which are arranged in each of the disk array devices 400a, 400b, and 400c and belong to the group selected at Operation S51 (S52).

The rearrangement unit 350 rearranges the logical volumes in each of the disk array devices including the added disk array device such that the number of logical volumes which belong to the group selected at Operation S51 becomes equal (S53). For example, in a case where among the logical volumes which belong to the group selected at Operation S51, three logical volumes are arranged in the disk array device 400a, two logical volumes are arranged in the disk array device 400b, two logical volumes are arranged in the disk array device 400c, and none of logical volumes is arranged in the newly added disk array device (which is denoted as "400d"), the rearrangement unit 350 rearranges the single logical volume arranged in the disk array device 400a in the disk array device 400d.

Here, the logical volume which is in a state of being unmounted may be designated as a logical volume to be rearranged. Accordingly, it becomes possible to perform the rearrangement without exerting influence on the access processing form the host device to the logical volume. Further, in the example described above, when all of the three logical volumes arranged in the disk array device 400a are in a state of being mounted, a single logical volume which is in a state of being unmounted may be rearranged in the disk array device 400d from any one of other disk array devices 400b and 400c.

The rearrangement unit 350 updates the information changed according to the rearrangement among the information registered in the cache management table 312 (S54). The rearrangement unit 350 determines whether the process has been completed for all the groups (S55). When it is determined that the process has been completed for all the groups, the process is ended. When it is determined that the process has not been completed for all the groups, the process proceeds to Operation S51.

With the configuration as described above, when the disk array device is added, the logical volumes which belong to the group are distributed and rearranged in the respective disk array devices including the added disk array device. Since the number of the disk array devices increases such that the parallelism in access to each disk array device increases, the logical volumes within the group are distributively arranged in all of the disk array devices such that it is possible to further increase the possibility that the access processing is performed at a high speed.

Here, as illustrated in FIG. 5, when a plurality of logical volumes is simply distributively arranged without taking into account anything else, accesses may be concentrated on a single disk array device. In the second embodiment, as an example of a method of preventing accesses from being concentrated on a single disk array device, a plurality of logical volumes designated by the mount request made from the same host device within a predetermined period of time is distributively arranged in a plurality of disk array devices. Accordingly, since the frequency of access to the plurality of disk array devices is performed in parallel is increased, it is possible to increase the possibility that the access processing is performed at a high speed.

Further, the processing functions of the control device 4 and the control servers 200 and 300 described in the embodiment described above may be implemented by a computer. In this case, a program in which process contents of the functions to be equipped in each communication device are described is provided, and the program is executed by the computer such that the processing functions are implemented in the computer. The program having described therein the processing functions may be recorded in a computer-readable recording medium. The computer-readable recording medium may include, for example, a magnetic storage device, an optical disk, an opto-magnetic recording medium, and a semiconductor memory. The magnetic storage device may include, for example, a hard disk drive (HDD), a flexible disk (FD), and a magnetic tape. The optical disk may include, for example, a DVD, a DVD-RAM, and a CD-ROM/RW. The opto-magnetic recording medium may include, for example, an MO (Magneto-Optical disk).

A program may be distributed in a portable recording medium such as, for example, a DVD or a CD-ROM in which the program is recorded. Further, a program may be stored in a storage device of a server computer and transferred from the server computer to other computer via network.

A computer which executes a program stores, for example, a program recorded in the portable recording medium or a program transferred from the server computer, in the storage device of its own. Also, the computer reads the program from the storage device of its own and executes a process according to the program. Further, the computer may read the program directly from the portable recording medium and execute the process according to the program. Further, the computer may execute the process according to the program received sequentially each time when the program is transferred from the server computer connected via network.

Further, each embodiment may be embodied by combining a plurality of embodiments without being inconsistent with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
a plurality of first storage devices;
a second storage device; and
a control device including a processor, the processor configured to
use the plurality of first storage devices as a primary storage and the second storage device as a secondary storage,
control access to a plurality of logical volumes, each of the logical volumes being associated with a respective virtual recording medium,
receive one or more mount requests for one or more of the logical volumes,
set all logical volumes for which a mount request is received within a predetermined period of time in a group,
register, in management information, each group that has been set, and
evenly distribute and store data of all of the logical volumes that are set in a single group, in the management information, among the plurality of first storage devices.

2. The storage device according to claim 1, wherein
the control device is coupled to a plurality of host devices, and
the processor is configured to register, in the management information, all the logical volumes for which a mount request is received within the predetermined period of time from a same host device in a group.

3. The storage device according to claim 1, wherein the processor is configured to move data of one of the logical volumes, for which an unmount request is received, from the primary storage to the secondary storage.

4. The storage device according to claim 1, wherein the processor is configured to rearrange the data stored in the plurality of first storage devices such that the data is evenly distributed and stored among the plurality of first storage devices and a third storage device, when the third storage device is able to be used as part of the primary storage.

5. The storage device according to claim 1, wherein the processor is configured to determine whether a registered specific logical volume is to be deleted from a corresponding group based on a number of times in which a mount request is received for the logical volumes set in the corresponding group, when a predetermined period of time or more has elapsed from a final mount request time at which a last mount request is received.

6. A storage control method executed by a control device which controls access to a plurality of logical volumes, each of the logical volumes being associated with a respective virtual recording medium, the control device being configured to be connected to a plurality of first storage devices and a second storage device and to use the plurality of first storage devices as a primary storage and the second storage device as a secondary storage, the storage control method comprising;
receiving one or more mount requests for one or more of the logical volumes and setting all logical volumes for which a mount request is received within a predetermined period of time in a group, and
evenly distributing and storing data of all of the logical volumes that are set in a single group, in the management information, among the plurality of first storage devices.

7. The storage control method according to claim 6, wherein the control device is coupled to a plurality of host devices, and the method further comprises:
registering, in the management information, all the logical volumes for which a mount request is received within the predetermined period of time from a same host device in a group.

8. The storage control method according to claim 6, further comprising:
moving data of one of the logical volumes, for which an unmount request is received, from the primary storage to the secondary storage.

9. The storage control method according to claim 6, further comprising:
rearranging, by the control device, the data stored in the plurality of first storage devices such that the data is evenly distributed and stored among the plurality of first storage devices and a third storage device, when the third storage device is able to be used as part of the primary storage.

10. The storage control method according to claim 6, further comprising:
   determining whether a registered specific logical volume is to be deleted from a corresponding group based on a number of times in which a mount request is received for the logical volumes set in the corresponding group, when a predetermined period of time or more has elapsed from a final mount request time at which a last mount request is received.

11. A non-transitory computer-readable recording medium storing a program that causes a computer to execute a procedure, which is included in a control device configured to control access to a plurality of logical volumes, each of the logical volumes being associated with a respective virtual recording medium, the control device being configured to be connected to a plurality of first storage devices and a second storage device, and to use the plurality of first storage devices as a primary storage and the second storage device as a secondary storage, the procedure comprising:
   receiving one or more mount requests for one or more of the logical volumes and setting all logical volumes for which a mount request is received within a predetermined period of time in a group, and
   evenly distributing and storing data of all of the logical volumes that are set in a single group, in the management information, among the plurality of first storage devices.

* * * * *